H. P. BURDICK.
Hay Rake and Loader.
No. 90,818.
2 Sheets—Sheet 1.
Patented June 1, 1869.
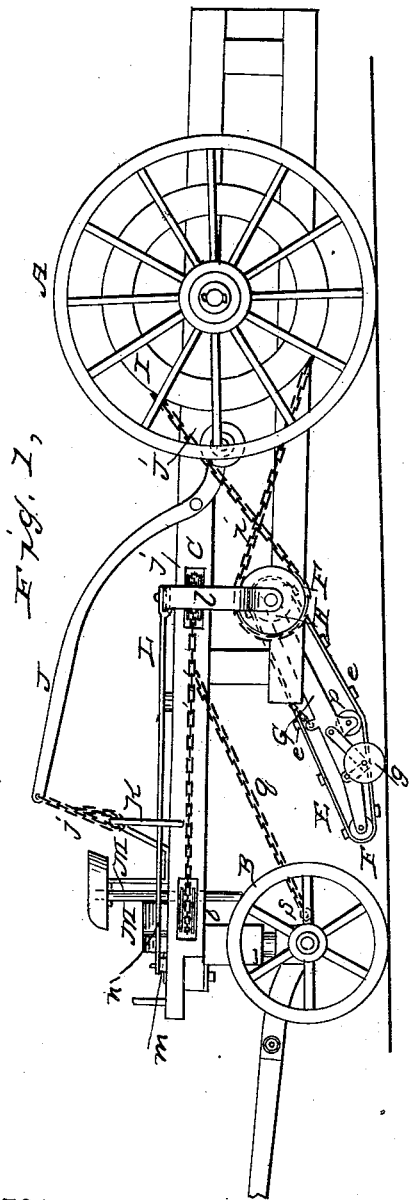

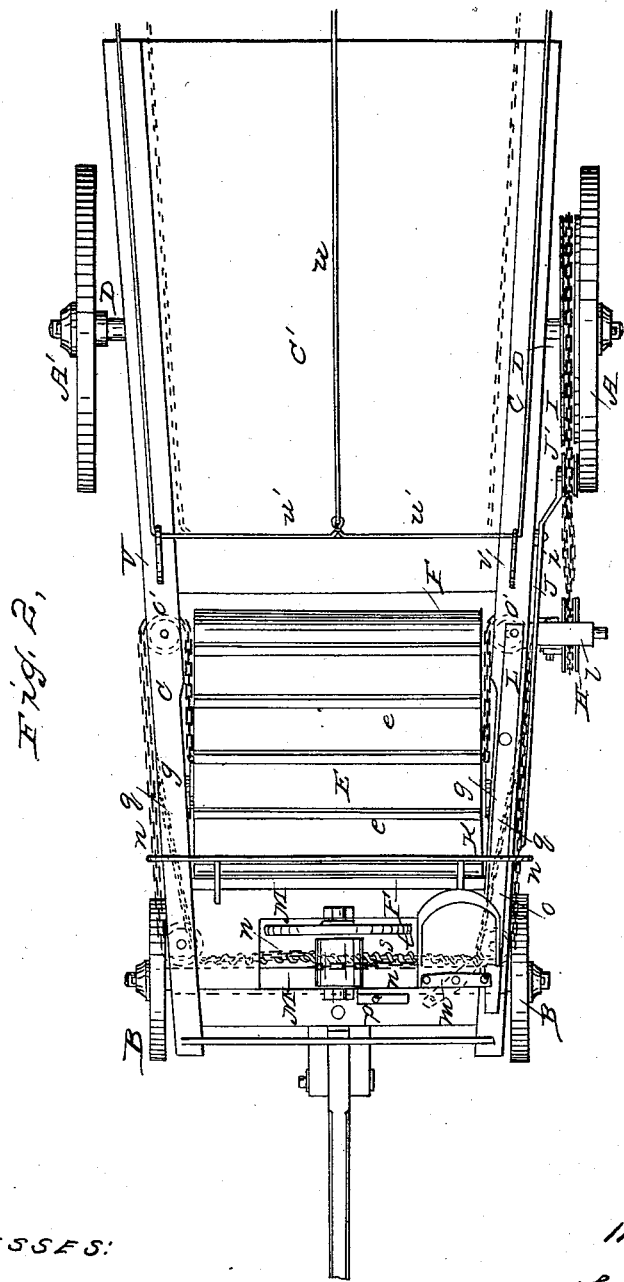

United States Patent Office.

HIRAM P. BURDICK, OF BUFFALO, NEW YORK.

Letters Patent No. 90,818, dated June 1, 1869.

---

IMPROVEMENT IN HAY-RAKERS AND LOADERS.

---

The Schedule referred to in these Letters Patent and making part of the same.

---

*To all whom it may concern:*

Be it known that I, HIRAM P. BURDICK, of the city of Buffalo, in the county of Erie, and State of New York, have invented a certain new and improved Self-Loading Hay-Wagon; and I do hereby declare that the following is a full and exact description thereof, reference being had to the accompanying drawings, making part of this specification, in which—

Figure I is a side elevation, and

Figure II, a plan of my improvements.

Like letters of reference designate like parts in each of the figures.

My invention consists of a self-loading hay-wagon, in which the endless carrier, for elevating the hay, is arranged between the hind and forward wheels, and in front of the platform on which the hay is loaded.

It further consists in the special devices or arrangements for elevating the carrier, and for unloading the hay, all as hereinafter fully shown and described.

In the drawings—

A A' represent the two hind wheels, and

B B, the two forward wheels of my wagon.

C is the frame, the rear portion of which is supported on the bent axle D, and provided with a bottom, C', that forms the part on which the hay is loaded, and which is preferably made somewhat wider than the forward portion, as shown.

The front end of the frame is supported on the forward truck, by means of a bolster, in any ordinary and suitable manner.

E is an endless carrier, of leather, canvas, or other suitable material, provided with transverse slats or ribs *e e*, by which the hay is elevated to the platform-space C'. This carrier passes around two rollers F F, mounted on the ends of two side-bars or pieces G G. This carrier is arranged in front of the platform C', the axis of the upper roller having its bearings in the side-pieces of the frame.

The free lower end of the carrier or elevator is supported on small wheels *g*, attached to the side-bars G, and made adjustable, so that the lower end of the carrier can be made to run close to the ground, being inclined forward, as shown.

*h* is a small tightening-roller, intermediate the end ones.

The shaft of the upper roller, at one end, extends outward beyond the frame, and has mounted on its end a chain-pulley, H, which communicates, by a chain, *i*, with a chain-wheel, I, attached to the spokes of wheel A, by which motion is imparted to the carrier.

J is a tightening-lever, pivoted to the side of the frame, and carrying a small pulley, J', at its end, which engages with the chain *i*, the tension of which is regulated by means of a chain, *j*, at the end of the long arm thereof, which attaches to a cross-bar, *k*, of the frame, or other fastening, so as to be shortened or lengthened at pleasure.

The pulley H is loosely mounted on its shaft, with which it is made rigid by any suitable clutch.

The engagement is effected by means of a lever, L, pivoted to the top of the frame, with an arm, *l*, extending downward and fitting loosely over the end of the roller-shaft, so as to press against the pulley.

This lever is operated and retained in place by a short lever, *m*, with a pin at the end, which engages in a small notch in the end of the lever L, when the two are brought in a position at right angles to each other, as shown in black lines, Fig. II, which keeps the pulley engaged.

The disengagement is effected by turning the lever *m*, as shown in red lines, when a spiral spring on the shaft, between the two parts of the clutch, causes them to separate, and retains them in that position till forced together by the arrangement just described.

M is a drum, arranged in the front end of the frame, turned by a hand-wheel, M'.

To this drum are attached two chains *n n*, which extend, in opposite directions, to the sides of the frame, where they pass around pulleys *o*, and thence backward around other similar pulleys *o'*, whence they descend and attach to the side-pieces G of the carrier.

By turning the hand-wheel M', the chains *n* will be wound upon the drum, and the lower end of the carrier elevated from the ground.

The drum is prevented from reversing by a dog, *p*, which fits in holes in the edge of the drum, as shown in Fig. II.

For elevating the carrier, while turning around at the ends of the windrows, I employ an automatic device, which consists of a chain, *q*, at each side of the frame, attached, at one end, to a rod, *s*, at the rear of and parallel to the front axle, and the other uniting with the chains *n*, near the pulleys *o'*.

The rod *s* is surrounded by a spiral spring, *t*, between the two chains *q*, which are loosely attached to the rod, so as to freely slide thereon.

In turning the forward truck in either direction, one or the other of the chains *q* will be tightened, which connecting, as it does, with the carrier, will cause the elevation of the latter.

When the axle of the forward truck is parallel with the rear axle, as it is when travelling in a straight line, the angle which the chains *q* make with the rod *s* is a right angle, or nearly so. As the truck begins to turn, this angle becomes more and more acute, until the friction of the ring which attaches the chain to the rod is overcome, when the former slides along the latter, compressing the spring *t* thereon.

This operates to release the chain before it has reached its limit of extension. Without some such provision the chain or its connections would be liable to be broken by the strain that would come upon it, after it had been fully extended.

By making the rod *s* to bow backward, toward its centre, this releasing of the chains can be made to take place sooner than it otherwise would.

The effect and function of the spring $t$ is to return the chains $q$ to their normal position, when the reversal of the truck permits the same to be done.

In operating with my self-loading wagon, it is drawn along astride of a windrow, the lower end of the carrier being thrust against the end of the same in close contact with the ground, so that the action of the slats thereof will be to elevate and carry the hay back and deposit it on the floor or platform C'.

If desired, the rear of the carrier can be made vertically adjustable, or be arranged at the top of the frame.

For unloading the hay, I attach a rope, $u$, to the rear of the frame, underneath the bottom, and then bring the rope forward, so that it will lie centrally on the platform.

At the front end of the platform the rope divides or connects with a cross-rope, $u'$, each end of which is passed through a staple, $v$, or equivalent, in the upper edge of the sides of the frame, to retain it in place, as shown in Fig. II.

The rope being in this position, a quantity of hay, of about one-third or one-quarter of the load, is placed thereon, when the ends $u'$ are disengaged from the staples $v$, and drawn backward over the top of the hay, as shown in red lines.

The hay is then loaded on top of this rope till the wagon is filled.

The carrier being now elevated, the wagon is taken to the barn or other place of deposit.

The ends of rope $u'$ being held or fastened to some object, the wagon is drawn forward from under the hay, which is left on the ground or floor, in the form in which it was while on the wagon, so as to be conveniently elevated, by any suitable hoisting-device, to the stack or loft, as the case may be.

The advantages and value of the several features of my improvements are obvious.

What I claim as my invention, and desire to secure by Letters Patent, is—

1. The hinged endless carrier G, in combination with the hay-platform C', permanently supported by both the front and rear wheels of the wagon, by means of the forward extension of the side-rails C, the whole arranged and operating as herein set forth and described.

2. The arrangement for elevating the carrier E, consisting of the drum M, hand-wheel M', dog $p$, chains $n$ $n$, and pulleys $o$ $o'$, substantially as set forth.

3. The combination and arrangement of the rod $s$, spring $t$, chains $q$ $n$, and endless carrier E, for automatically elevating the latter, as set forth.

4. The rope $u$ $u'$, for unloading, when applied and operating in the manner specified.

H. P. BURDICK.

Witnesses:
JAY HYATT,
JNO. J. BONNER.